(No Model.)
M. L. GRIFFIN.
PROCESS OF MAKING CALCIUM BISULFITE LIQUOR.
No. 526,076. Patented Sept. 18, 1894.
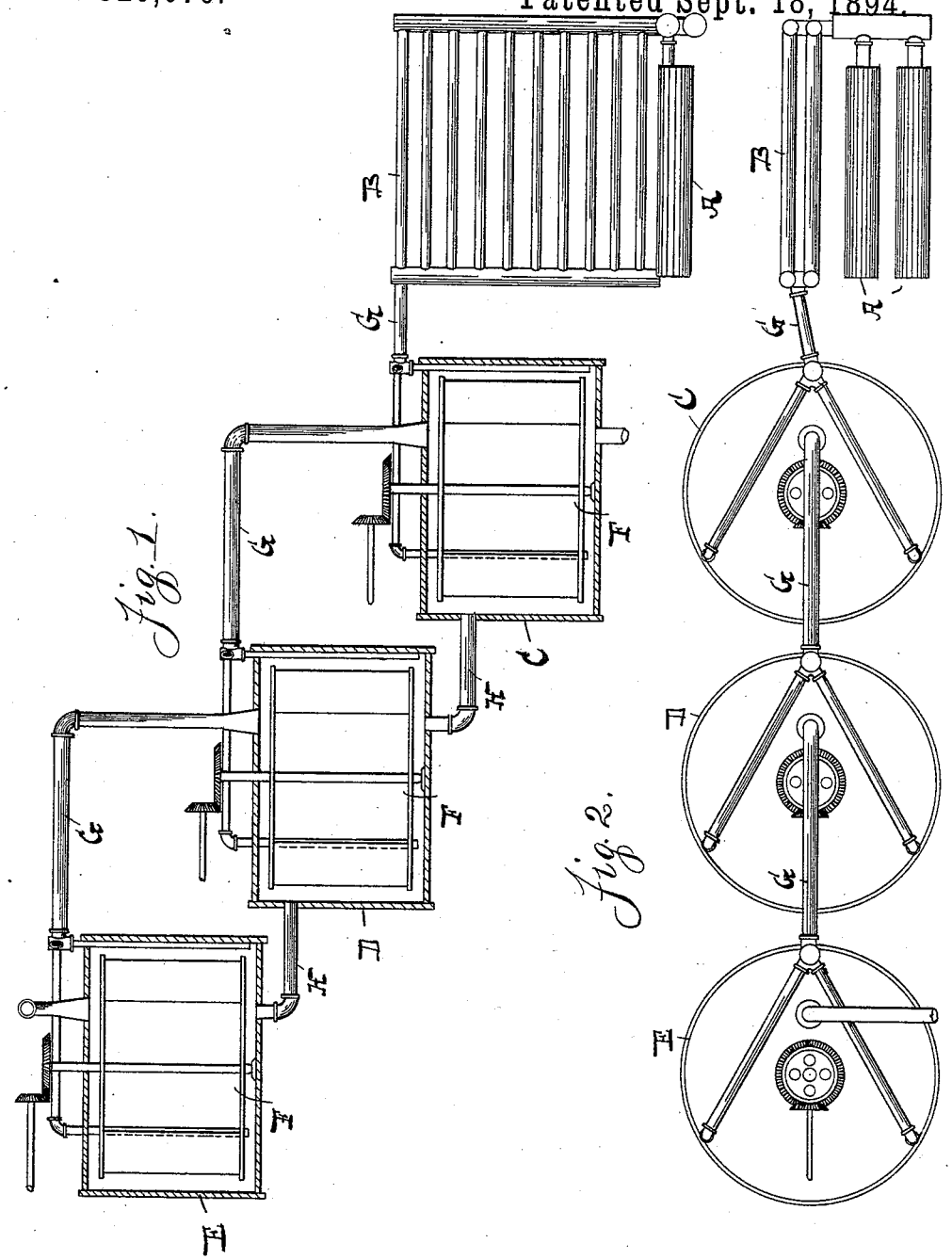

UNITED STATES PATENT OFFICE.

MARTIN L. GRIFFIN, OF HOLYOKE, MASSACHUSETTS.

PROCESS OF MAKING CALCIUM BISULFITE LIQUOR.

SPECIFICATION forming part of Letters Patent No. 526,076, dated September 18, 1894.

Application filed April 8, 1892. Serial No. 428,373. (No specimens.)

*To all whom it may concern:*

Be it known that I, MARTIN L. GRIFFIN, of Holyoke, in the county of Hampden and State of Massachusetts, have invented a new and useful Process of Making Bisulfite Liquor for the Reduction of Wood to Pulp, of which the following is a specification.

My invention is based upon the discovery made by me that the "lime sludge" resulting from the treatment of carbonate of soda liquors with lime in the process of making caustic soda and caustic soda liquors for any purpose, can be utilized as a substitute for lime in making bi-sulfite liquors.

In what is known as the "soda process" for making chemical fiber, the alkali is recovered after each operation of digesting the wood, by evaporation and incineration of the concentrated alkaline liquid. The resulting black ash is lixiviated and the solution treated with lime, which produces the caustic soda liquor required for the wood and a precipitate of carbonate of lime, known as "lime sludge." It is this lime sludge, which contains a large amount of fine charcoal dust and impurities from the lime, and which exists in large quantities, which I have discovered is more valuable than native rock carbonate of calcium as I will explain, when obtained in purified form and utilized as above stated.

The manner in which I obtain this purified form of lime sludge is as follows: In the first place, the lixiviated soda liquor obtained in the recovering process above referred to is taken before being treated with the lime, and is filtered through any suitable medium to free it from all mechanical matter. For this purpose I use any of the well known forms of filters for purifying water, it being important merely that a hard and coarse quality of silicious sand be employed as the filtering medium, as, otherwise, serious trouble might arise in the manufacture of the fiber. Having thus removed all suspended matter from the solution, it is causticized with lime as heretofore, and the precipitate or lime sludge is allowed to settle. After drawing off the caustic the sludge is washed with water and the remaining alkali thus removed. I next eliminate from this precipitated carbonate of lime all of the heavy particles contained therein, which particles consist mostly of impurities left by the lime, and for this purpose I prefer to pump the same into a tank of considerable depth, said tank being provided with an overflow at the top and having therein, at or near the bottom thereof a perforated inlet pipe for water arranged in the form of a coil, whereby, when a stream of water is forced through said pipe, it will issue from the perforations therein and, passng upwardly within the tank, will impart to the contents of the latter a boiling movement and cause the light precipitate to pass off by the overflow, while the heavier particles thereof will settle to the bottom of the tank. To still further secure this result, I prefer to connect the overflow of said tank with a riffling trough, that is to say, a trough arranged at a gentle incline and provided with transverse partitions or riffles inclined slightly against the direction of flow of the liquid, whereby any heavy particles of the precipitate which have escaped from the tank will be caused to settle at the bottom of said trough. The precipitate of carbonate of lime thus purified may then be separated from the water by settling or by pumping into a filter press, and dried, when it is in condition for transportation.

In the manufacture of wood fiber by what is known as the "sulfite process," the cooking solution is composed of sulfurous acid gas and an alkaline earth base, chiefly calcium oxid, otherwise known as "lime;" or carbonate of calcium—native limestone or marble. As at present practiced, sulfurous acid gas is produced by burning native sulfur or roasting pyrites and made to pass either through milk of lime or over limestone with a spray of water.

By my invention the use of the more expensive lime in this process is avoided and this cheap, precipitated carbonate of lime, purified as above described, is substituted.

No particular form of apparatus is required for this operation, but I prefer to employ a mixing tank provided with an agitator, in which the precipitated carbonate of lime is kept in a state of constant agitation and of a uniform consistence, and then to cause it to flow from one to the other of a series of, say, three tanks, also provided with agitators and arranged one above the other, the sulfurous acid being drawn in the opposite direction through the liquid from the retorts, by any suitable exhaust pump, until the liquid flows off of the required strength. In the accompanying drawings I have illustrated such form of apparatus.

Figure 1 is an elevation, partly in section, of the apparatus. Fig. 2 is a plan view thereof.

The letters A A designate the sulfur ovens; B, the cooling pipes for the gases, and C, D and E the three absorption tanks containing the lime sludge, purified as described. The tank in which said lime sludge is mixed with water to the right consistence is not shown, but it may be located above the tank E to permit the mixture to flow into the latter, or it may be located at any convenient point and the mixture be pumped therefrom into said tank E. Each of the absorption tanks is provided with an agitator F operated by bevel gearing as shown or in any convenient manner, whereby the contents of said tanks are kept in a constant state of agitation. By means of pipes G the gases pass from the pipes B to the bottom of tank C, thence upwardly through said tank and to the bottom of tank D, and in the same manner from tank D to tank E. By means of pipes H the liquor passes from tank E to tank D and from the latter to tank C, from which the finished liquor is drawn for use. Such circulation of the liquor and the gases in opposite directions through the series of tanks causes the latter to be wholly absorbed by the former. As before stated, I have shown this form of apparatus merely as one example of the various forms which can be employed in connection with my invention, and I do not limit myself to its use.

By means of my invention I am not only enabled to thus utilize a material which has hitherto possessed but little commercial value, and thereby effect a very material saving in the cost of producing the liquor used in the making of wood fiber by the "sulfite process," but I produce a liquor from which even a better quality of fiber can be made than that heretofore made with the use of lime inasmuch as I avoid the impurities common to lime, consisting chiefly of silica, ashes and sulfide of lime, resulting from burning the same with coal containing sulfur, also unburned portions of the limestone, together with the oxids of aluminum and iron which latter is very detrimental to the production of first quality of fiber. I have discovered also that this finely divided precipitate of carbonate of lime is far superior to limestone for this purpose for the reason that in this fine state of subdivision it more readily combines with the sulfurous acid gas and is less difficult to work with in consequence. By changing the consistence of this precipitate with water any desired change in the strength of the acid liquid may be obtained with no change in the apparatus. Hence also by keeping the same consistence in the mixture a uniform strength of acid liquor may be obtained.

The process herein described is equally applicable to the treatment and utilization of the lime sludge resulting in the production of caustic soda from carbonate of soda for the trade, as well as to the lime sludge resulting in the causticizing of carbonated soda liquors for the production of chemical fibers by the "soda process" as above described.

Having thus fully described my invention, what I claim, and desire to secure by Letters Patent, is—

The process of utilizing the lime sludge resulting from the treatment of carbonated soda liquors with lime in the manufacture of caustic soda and caustic soda liquors, as a substitute for lime in the manufacture of bisulfite liquors, herein described, the same consisting in (first) washing said lime sludge to remove the alkali therefrom; (second) riffling the sludge to separate any heavy impurities; (third) separating from the resulting liquid the solid matter contained therein; and (fourth) charging the sludge thus purified with sulfurous acid gas.

MARTIN L. GRIFFIN.

Witnesses:
W. H. CHAPMAN,
J. E. CHAPMAN.